(12) United States Patent
Johnson et al.

(10) Patent No.: US 9,103,925 B2
(45) Date of Patent: *Aug. 11, 2015

(54) RADIATION SCANNING AND DISABLING OF HAZARDOUS TARGETS IN CONTAINERS

(75) Inventors: James H. Johnson, Ferndale, WA (US); James E. Clayton, San Jose, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 303 days.

This patent is subject to a terminal disclaimer.

(21) Appl. No.: 13/550,123

(22) Filed: Jul. 16, 2012

(65) Prior Publication Data

US 2013/0001441 A1 Jan. 3, 2013

Related U.S. Application Data

(63) Continuation of application No. 11/602,764, filed on Nov. 21, 2006, now Pat. No. 8,223,918.

(51) Int. Cl.
*G01N 23/04* (2006.01)
*G01V 5/00* (2006.01)

(52) U.S. Cl.
CPC .................... *G01V 5/0016* (2013.01)

(58) Field of Classification Search
CPC .............. G21K 5/04; G21K 5/10; A61L 2/08; A61L 2/082; A61L 2/087; G01V 5/0016
USPC .......................................... 378/57, 64, 68, 69
See application file for complete search history.

(56) References Cited

U.S. PATENT DOCUMENTS

| | | |
|---|---|---|
| 3,753,651 A | 8/1973 | Boucher |
| 5,585,575 A | 12/1996 | Corrigan et al. |
| 5,962,995 A | 10/1999 | Avnery |
| 6,242,664 B1 | 6/2001 | Crihan |
| 6,452,263 B1 | 9/2002 | Benedetto |
| 6,511,893 B1 | 1/2003 | Woodruff et al. |
| 6,570,234 B1 | 5/2003 | Gardner |
| 6,610,977 B2 | 8/2003 | Megerle et al. |
| 6,650,003 B1 | 11/2003 | Benedetto |
| 6,711,939 B2 | 3/2004 | Megerle et al. |
| 6,753,536 B2 | 6/2004 | Humphreys et al. |

(Continued)

OTHER PUBLICATIONS

Rocco Casagrande; "Technology Against Terror"; Scientific American, pp. 83-87, Oct. 2002; www.sciam.com.

(Continued)

*Primary Examiner* — Courtney Thomas
(74) *Attorney, Agent, or Firm* — Cozen O'Connor; Brandon N. Sklar

(57) ABSTRACT

In one example, a method of examining a container is disclosed comprising detecting a potential threat within contents of a container using radiation scanning and disabling the potential threat with radiation. In another example, a method of examining a container is disclosed comprising scanning at least a portion of the container with a first radiation beam, detecting radiation interacting with contents of the container, identifying a potential threat contained based, at least in part, on the detected radiation, and disabling the potential threat with a dose of radiation from a second radiation beam. The potential threat may be a nuclear, chemical, and/or biological weapon, for example. Chemical and/or biological detectors may also be provided. The threat and/or electronics associated with the threat, may be disabled. Systems are also disclosed.

26 Claims, 5 Drawing Sheets

(56) References Cited

U.S. PATENT DOCUMENTS

| | | |
|---|---|---|
| 6,806,476 B2 | 10/2004 | Rose et al. |
| 6,822,250 B2 | 11/2004 | Korenev |
| 6,834,533 B2 | 12/2004 | Megerle |
| 6,855,618 B2 | 2/2005 | Woodruff et al. |
| 6,867,052 B2 | 3/2005 | Bodenhamer et al. |
| 6,872,927 B2 | 3/2005 | Geisler et al. |
| 6,890,832 B1 | 5/2005 | Kerwin et al. |
| 6,905,661 B2 | 6/2005 | Ryan et al. |
| 6,916,445 B2 | 7/2005 | Centanni et al. |
| 6,917,423 B2 | 7/2005 | Gardner et al. |
| 6,917,533 B2 | 7/2005 | Gardner et al. |
| 6,928,143 B2 | 8/2005 | Menear et al. |
| 6,936,820 B2 | 8/2005 | Peoples |
| 6,964,378 B2 | 11/2005 | Taddiken |
| 6,998,617 B2 | 2/2006 | D'Emilio et al. |
| 7,026,944 B2 | 4/2006 | Alioto et al. |
| 7,032,467 B2 | 4/2006 | Yoon |
| 7,057,721 B2 | 6/2006 | Gardner et al. |
| 7,078,716 B2 | 7/2006 | Fink et al. |
| 7,113,275 B2 | 9/2006 | Gardner et al. |
| 7,162,007 B2 | 1/2007 | Elyan et al. |
| 7,189,978 B2 | 3/2007 | Avnery |
| 7,208,889 B2 | 4/2007 | Zavadtsev et al. |
| 7,247,865 B2 | 7/2007 | Flores et al. |
| 7,512,511 B1* | 3/2009 | Schultz et al. .............. 702/127 |
| 8,223,918 B2* | 7/2012 | Johnson et al. .............. 378/57 |
| 2003/0122086 A1 | 7/2003 | Ryan et al. |
| 2003/0132279 A1 | 7/2003 | Stemmle |
| 2003/0132398 A1 | 7/2003 | Wang |
| 2003/0136920 A1 | 7/2003 | Flores et al. |
| 2003/0145664 A1 | 8/2003 | Schwarz et al. |
| 2003/0174810 A1 | 9/2003 | Korenev et al. |
| 2003/0218142 A1 | 11/2003 | Rose et al. |
| 2004/0000648 A1 | 1/2004 | Rissler et al. |
| 2004/0011967 A1 | 1/2004 | Nutting et al. |
| 2004/0016892 A1 | 1/2004 | McIntyre et al. |
| 2004/0022665 A1 | 2/2004 | Lu |
| 2004/0051054 A1 | 3/2004 | Taddiken |
| 2004/0061076 A1 | 4/2004 | Bridges, III et al. |
| 2004/0101435 A1 | 5/2004 | Centanni et al. |
| 2004/0183032 A1 | 9/2004 | Fink et al. |
| 2004/0211923 A1 | 10/2004 | Bridges, III et al. |
| 2005/0077472 A1 | 4/2005 | Korenev |
| 2005/0185178 A1 | 8/2005 | Gardner, Jr. et al. |
| 2005/0205772 A1 | 9/2005 | Zavadtsev et al. |
| 2006/0008052 A1 | 1/2006 | Elyan et al. |
| 2006/0018735 A1 | 1/2006 | Takehara et al. |
| 2006/0028644 A1 | 2/2006 | Gardner, Jr. et al. |
| 2006/0076507 A1 | 4/2006 | Avnery |

OTHER PUBLICATIONS

"Industrial Electron Accelerators and Applications"; Library of Congress Cataloging-in-Publication data, p. 16, Hemisphere Publicating Corporation, 1988.

Bly, James H. "Electron Beam Processing"; Library of Congress Catalog Card No. 88-80339, p. 22, Internatinal Information Associates, Yardley, PA. 1988.

"Radiation Protection Design Guidelines for 0.1-100 MeV particle Accelerator Facilities"; NCRP Report No. 51, issued Mar. 1, 1977, p. 88, National Council on Radiation Protection and Measurements, Washington, D.C.

J.F. Swinwood, T.D. Waite, P. Kruger and S.M. Rao; "Radiation Technologies for Waster Treatement; A Global Perspective"; Quarterly Journal of the International Atomic Energy Agency, vol. 36, No. 1; 1994.

* cited by examiner

RADIATION SCANNING AND DISABLING OF HAZARDOUS TARGETS IN CONTAINERS

RELATED APPLICATION

The present application is a continuation of U.S. patent application Ser. No. 11/602,764, which was filed on Nov. 21, 2006, which is assigned to the assignee of the present application and is incorporated by reference herein. U.S. patent application Ser. No. 11/602,764 will issue on Jul. 17, 2012 bearing U.S. Pat. No. 8,223,918.

FIELD OF THE INVENTION

Radiation scanning of objects, including large objects such as cargo containers, to identify hazardous targets and to disable or render harmless the identified targets.

BACKGROUND OF THE INVENTION

Radiation is commonly used in the non-invasive inspection of contents of objects, such as luggage, bags, briefcases, cargo containers, and the like, to identify hidden contraband at airports, seaports, and public buildings, for example. The contraband may include hidden guns, knives, explosive devices and materials, illegal drugs, and a nuclear or a "dirty" radioactive bomb, for example. One common inspection system is a line scanner, where the object to be inspected is passed between a stationary source of radiation, such as a gamma ray radiation or X-ray radiation, and a stationary detector. The transmitted radiation is detected and measured. Radiographic images of the contents of the object may be generated for inspection. The images show the shape, size and varying densities of the contents.

While the smuggling of guns, explosives and other contraband onto planes in carry-on bags and in luggage has been a well known, ongoing concern, a less publicized but also serious threat is the smuggling of contraband across borders and by boat in large cargo containers. Only 2%-10% of the 17 million cargo containers brought to the United States by boat are inspected. "Checkpoint Terror", U.S. News and World Report, Feb. 11, 2002, p. 52.

Standard cargo containers are typically 20-50 feet long (6.1-15.2 meters), 8 feet high (2.4 meters), and 6-9 feet wide (1.8-2.7 meters). Air cargo containers, which are used to contain a plurality of pieces of luggage or other cargo to be stored in the body of an airplane, may range in size (length, height, width) from about 35×21×21 inches (0.89×0.53×0.53 meters) up to about 240×118×96 inches (6.1×3.0×2.4 meters). Large collections of objects, such as many pieces of luggage, may also be supported on a pallet. Pallets, which may have supporting side walls, may be of comparable sizes as cargo containers and use of the term "cargo conveyance" encompasses cargo containers and pallets. As used herein, the term container is meant to include, but should not be limited to, cargo, air cargo containers, pallets, luggage, and handheld carry-ons.

Atomic bombs and "dirty bombs," which may use a conventional explosive and a conventional trigger to disperse radioactive material over a wide territory, are examples of nuclear devices that may be smuggled in cargo conveyances and smaller objects. These devices often include control and/or trigger electronics, such as timing devices or communications devices, that are used to detonate the explosive and/or trigger the nuclear device. Conventional explosive devices, comprising a trinitrotoluene (TNT), dynamite, and fertilizer based explosives, may also include control and/or triggering electronics. Radioactive, fissionable, fissile, and fertile materials that may be used to manufacture nuclear devices may also be smuggled.

Additionally, hazardous chemical and biological materials may be smuggled in containers in a similar fashion. Chemical agents, such as chlorine gas, mustard gas, phosgene, sarin and other nerve agents, for example, and biological agents, such as anthrax, small pox, tularemia, and hemorrhagic fever, for example, may be packaged and hidden in cargo conveyances and other objects for shipment across borders. Further, some chemical and biological agents may be smuggled inside a cargo conveyance or other objects in the form of an operational chemical or biological weapon. Similar to the explosive weapons, the chemical or biological weapon may also include control and/or trigger electronics, such as timing devices or communication devices. Such chemical and biological agents and weapons may be detected using chemical or biological sensors, as described, for example, in U.S. Pat. No. 6,610,977, U.S. Pat. No. 5,585,575, U.S. Pat. No. 6,711,939, and U.S. Pat. No. 6,834,533, which are incorporated by reference herein, in their entireties.

A variety of techniques are used to locate nuclear devices, nuclear materials, radioactive materials (that may not be nuclear materials), hazardous chemicals, hazardous biological agents in cargo conveyances. Although time consuming, manual inspection of the contents of the objects in a container may be highly effective in identifying hazardous targets. Additionally, identification of radioactive materials and nuclear devices and other weapons may be accomplished by passive inspection systems, such as a radiation detector.

Active systems that employ radiation to scan cargo and containers are often used. In one example of an X-ray scanning system, U.S. Pat. No. 5,524,133 discloses scanning systems for large objects, such as freight in a container or on a vehicle. In one embodiment, two stationary sources of X-ray radiation are provided, each emitting a beam that is collimated into a fan beam. The sources facing adjacent sides of the freight and the fan beams are perpendicular to each other. A stationary detector array is located opposite each source, on opposite sides of the freight, to receive radiation transmitted through the freight. The material content of the freight is thereby determined. Additional radiation systems for inspecting large cargo are described in U.S. Pat. No. 6,292,533, U.S. Pat. No. 5,917,880, and U.S. Pat. No. 5,638,420, for example.

Likewise, in U.S. Pat. No. 6,347,132 B1, a high energy X-ray inspection system for detecting nuclear weapons materials is described wherein an object is scanned by a high energy X-ray fan beam or pencil beam. To obtain additional information about the contents of the luggage, radiation detectors may be provided to detect scattered radiation, as described in U.S. Pat. No. 5,642,394, for example. Systems may combine detection of scattered radiation in addition to the detection of transmitted radiation.

Another technique to enhance the information that may be derived about the material composition of the contents of the objects is to scan the object with radiation beams having two different energy levels. A ratio of the attenuation detected at two different energy levels is indicative of the atomic numbers of the material through which the radiation beam passes. Dual energy systems enable better detection of plastic materials and illegal drugs. U.S. Pat. No. 5,524,133, which is incorporated by reference herein, describes a dual energy technique for identifying contents of an object.

Computed tomography ("CT"), as discussed in U.S. Pat. No. 5,567,552 for example, enables the reconstruction of the cross-sectional images of luggage contents, facilitating the identification of the items in the luggage. CT images also provide higher resolution, greater image contrast and greater sensitivity to characteristics of the object being scanned, than radiographs. Scanning methods, such as CT, may be used to generate images showing weapon control and trigger electronics, for example.

In contrast to the cargo container size ranges, typical airport scanning systems for carry-on bags have tunnel entrances up to about 0.40×0.60 meters. Scanning systems for checked luggage have travel openings that are only slightly larger. Since only bags that fit through the tunnel may be inspected, such systems cannot be used to inspect cargo containers. The low energies used in typical X-ray luggage and bag scanners are too low to penetrate through the much larger cargo containers. In addition, many such systems are too slow to economically inspect larger objects, such as cargo containers.

While known detection systems identify and locate potential threats, these systems do not provide a means for disabling the threat.

SUMMARY OF THE INVENTION

Electrons and photons have been used for many years to cross link materials and to sterilize medical components. For example, food products have been treated with radiation to kill bacteria, fungi, and pests. Radiation has also been used to stop sprouting and other negative effects from the prolonged storage of food products. The energies used in such applications range from about a few keV to about 10 MeV for electrons and from about 50 keV to about 10 MeV for photons. Radioactive materials, such as Cesium-137 ($^{137}$Cs) and Cobalt-60 ($^{60}$Co), have been used extensively for cross linking and the sterilization of medical goods. Electron systems have been used to clean flue gases from power plants and to treat water and chemical waste streams. Additionally, studies have been done using $^{60}$Co to treat water that has been provided to municipal drinking supplies. It is also known that electronics, such as semiconductor devices, are susceptible to damage and/or destruction from radiation. For this reason, electronics employed on satellites typically include extensive shielding, insulation, and redundancies, for example, as discussed in U.S. Pat. No. 6,511,893, U.S. Pat. No. 6,650,003 and U.S. Pat. No. 7,071,749, which are incorporated by reference herein. The military has studied the use of intense bursts of radiation to damage sensitive communication electronics in satellites and communication systems.

Known radiation scanning systems that identify hazardous targets in containers do not use radiation to disable an identified threat in the form of a explosive device, chemical agent, or biological agent. As used herein, the term "disable" or "disabling" is meant to include whole or partial disabling of a threat.

In accordance with one embodiment, a method of examining a container is disclosed comprising detecting a potential threat within contents of a container using radiation scanning and disabling the potential threat with radiation.

In accordance with another embodiment, a method of examining a container is disclosed comprising scanning at least a portion of the container with a first radiation beam and detecting radiation interacting with contents of the container. The method further comprises identifying a potential threat contained within the container based, at least in part, on the detected radiation and disabling the potential threat with a dose of radiation from a second radiation beam.

In accordance with another embodiment, a method of examining a container is disclosed comprising detecting the presence of a chemical agent in the container using a chemical detector and disabling the chemical agent with a dose of radiation from a radiation beam.

In accordance with another embodiment, a system for examining and disabling a potential threat is disclosed comprising at least one radiation source capable of operating in a first mode and a second mode. The at least one radiation source is configured to scan at least a portion of a container using a radiation beam, in the first mode. At least one detector is positioned to detect the radiation beam interacting with contents in the container. At least one processor is coupled to the at least one detector. The at least one processor is configured to identify a potentially hazardous object based, at least in part, on data from the at least one detector. The at least one radiation source is further configured to deliver radiation to the potential threat to disable the potential threat, in the second mode.

In accordance with another embodiment, a system for examining and disabling a potential threat is disclosed comprising at least one radiation source configured to scan at least a portion of a container using a first radiation beam. The at least one radiation source is movable between a first position and a second position. At least one first detector is positioned to detect the first radiation beam interacting with contents in the container. A mechanism is configured to move the at least one radiation source between the first position to the second position. At least one processor is coupled to the at least one first detector and the mechanism. The at least one processor is configured to identify the potential threat based, at least in part, on data from the at least one first detector. The at least one processor is also configured to instruct the mechanism to move the at least one radiation source between the first position and the second position and to instruct the at least one radiation source to irradiate a potential threat with a second radiation beam to disable the potential threat.

In accordance with another embodiment, a distributed system for examining and disabling a potential threat is disclosed comprising a first system in a first location for examining a container and a second system in a second location different than the first location to deliver radiation to the potential threat. The first system comprises at least one first accelerator source to scan at least a portion of the container, at least one first detector positioned to detect radiation interacting with contents in the container, and at least one second detector to detect at least one of a chemical agent or a biological agent. At least one first processor is coupled to the at least one first detector and the at least one second detector. The at least one first processor is configured to identify the potential threat based, at least in part, on data received from at least one of the at least one first detector or the at least one second detector. The second system comprises at least one second accelerator source configured to deliver radiation to disable the potential threat.

As used herein, the term radiation is meant to include, but should not be limited to, beams of X-ray radiation, gamma ray radiation, electrons and neutrons. Also, as used herein, the "energy" of a radiation beam refers to an energy characteristic of the radiation beam. The characteristic may be the energy endpoint or peak energy of the beam, for example. The radiation energy may also refer to an average or nominal value of the energy of the beam. Other characterizations of the energy of the beam may be used, as well.

DESCRIPTION OF THE PREFERRED EMBODIMENTS

In accordance with embodiments of the invention, a system and method identifies a potential threat or hazardous object in a container, such as a cargo conveyance, and disables the potential threat in whole or in part using radiation from a radiation source. As used herein, the term "radiation" is meant to include, but should not be limited to, beams of electrons, X-ray radiation, gamma ray radiation and neutrons. In some embodiments, the system uses radiation scanning, such as X-ray scanning, chemical detectors, and/or biological detectors to identify at least a potential presence of high atomic number material or high density material, that could be special nuclear material ("SNM") or shielding for SNM, chemical agents, and/or biological agents. Although not required, the same high energy radiation source used in scanning the container may be used to disable the potential threat.

Figure 1:
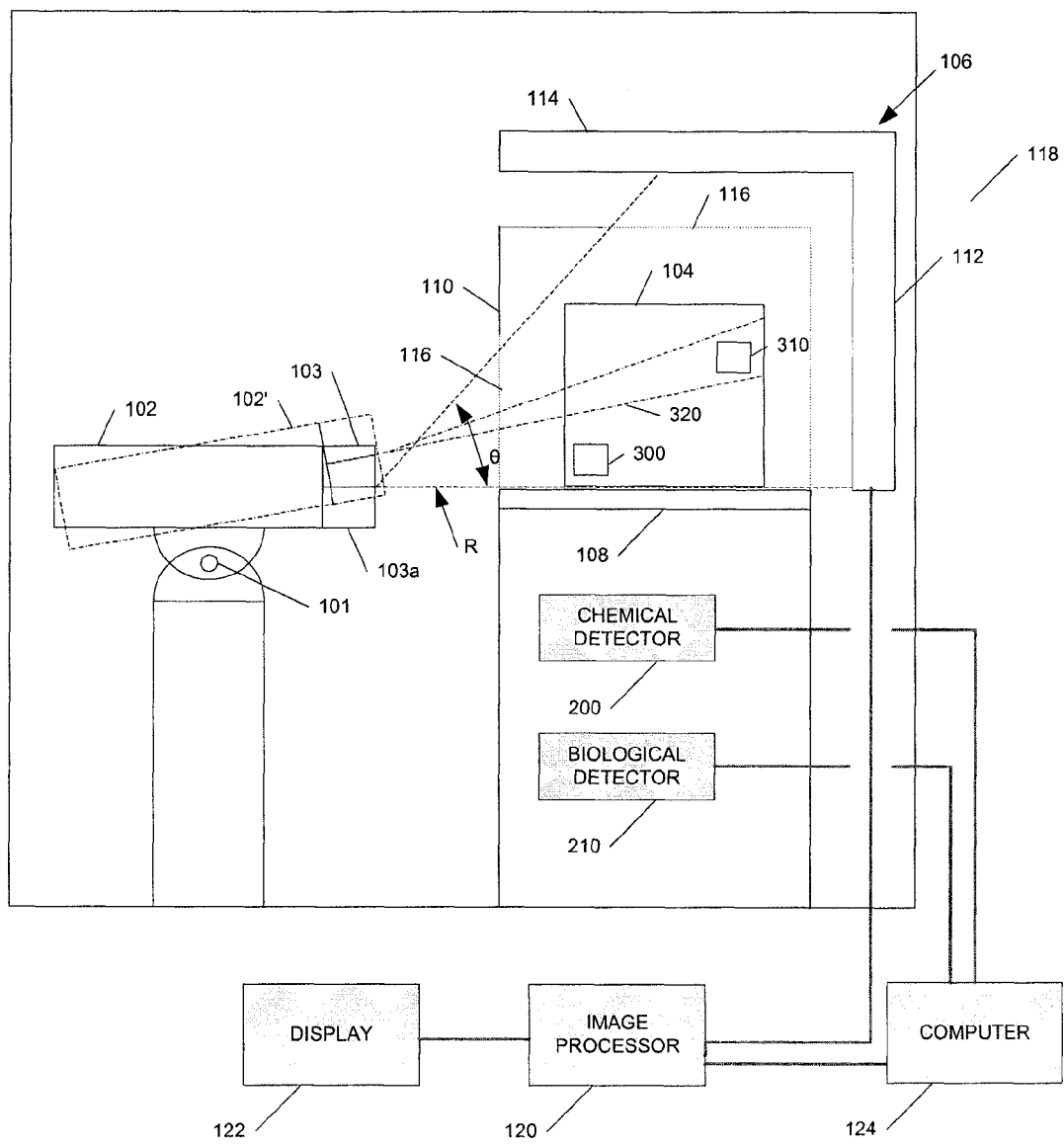
FIG. 1 is a schematic representation of a system in accordance with embodiments of the invention.

FIG. 1 is a schematic representation of an example of a radiation inspection/disabling system 100 in accordance with embodiments of the invention. A radiation source 102 is shown on one side of a container 104 containing hazardous objects 300 and 310. The radiation may be X-ray radiation and the source 102 may be a linear accelerator, for example. The container 104 may be a cargo conveyance, for example. The cargo conveyance 104 may be a standard cargo container, which has a width of about 6-9 feet (1.8-2.7 meters) and a length of 20-40 feet (6.1-12.2 meters), for example, or may include alternatively shaped and sized containers or other objects. The hazardous objects 300, 310 may comprise high atomic number or high density material, conventional explosives, a chemical agent, and/or a biological agent, and may also comprise electronics, such as control and/or triggering electronics, associated therewith.

The source 102 may include a collimator 103. A slot 103a may be provided in the collimator 103 to define the radiation beam R. A detector 106 is supported on an opposite side of the cargo conveyance 104, to detect radiation interacting with the cargo. The detector 106 may be positioned to detect radiation transmitted through the cargo conveyance 104, for example. The cargo conveyance 104 is conveyed by a conveyor system 108 through a shielded tunnel 110, between the source 102 and the detector 106. The detector 106 may be an L-shaped detector array, with a first arm 112 behind the tunnel and a second arm 114 above the tunnel 110, for example. A linear or other shaped detector array may be used, as well. As is known in the art, scattering detection may be used in addition to or instead of other radiation scanning techniques.

The tunnel 110 has windows 116 to allow for the passage of an X-ray radiation beam R. Shielding walls 118 surround the source 102, the detector 106, and a portion of the conveying system 108, as is known in the art. Concrete may be used, for example. In another example, a multi-layer shield comprising an inner layer of steel or lead, a middle layer of polyethylene or borated polyethylene, and an outer layer of lead or steel may be used, for example. Openings (not shown) are provided in the shielding walls 118 for the cargo conveyance 104 to be conveyed into and out of the scanning system 100 by the conveyor system 108. X-ray scanning systems are described in more detail in U.S. application Ser. No. 11/070,030 (U.S. Pat. No. 8,263,938), U.S. application Ser. No. 11/070,143 (U.S. Pat. No. 7,257,188), and U.S. application Ser. No. 11/070,032 (U.S. Pat. No. 7,423,273), for example, all of which were filed on Feb. 28, 2005, are assigned to the assignee of the present invention, and are incorporated by reference herein.

The X-ray source 102 may be positioned so that the lower portion of the X-ray radiation beam is parallel or nearly parallel to the top of the conveyor system 108. If the radiation beam R intercepts the conveyor system 108 and the conveyor system 108 comprises a belt or track, a material that causes low attenuation of radiation may be used so that the conveyor system 108 does not interfere with the scanning of the cargo conveyance 104. If the conveyor system 108 comprises rollers, a gap may be provided among the plurality of rollers, where necessary. A window may also be provided in the structure supporting the conveyor system 508, if necessary.

Collimators (not shown) may be provided between the cargo conveyance 104 and the detector 106 to block scattered radiation from reaching the detector 106. The conveyor system 108 may be reversed to examine a portion or the entire cargo conveyance 104 again or to irradiate the cargo conveyance 104 with a different energy distribution, for example. The cargo conveyance 104 may also be irradiated with multiple energies by rapidly cycling between two or more energy levels as the cargo conveyance 104 is being conveyed through the scanning unit 100.

The detector 106 is electrically coupled to an image processor block 120, which is coupled to a display 122. The image processor block 120 comprises analog-to-digital conversion and digital processing components, as is known in the art. One or more computers 124 is electrically coupled to and controls the operation of the X-ray source 102, the detector 106, the conveyor system 108, the image processor 120, and/or the display 122. The connections between the computer and all the components are not shown, to simplify the Figure. The one or more computers 124 may provide the processing functions of the image processor 120, as well.

As shown in FIG. 1, the X-ray radiation beam R passes through the collimator 103 and is directed towards the region above the conveyor system 108, to irradiate the cargo conveyance 104. As known in the art, the collimator 103 may be an adjustable collimator such that the collimator 103 may adjust the radiation beam R to diverge over an angle θ. This angle may also be adjusted using secondary collimators (not shown in the figures). The X-ray source 102 is preferably displaced a sufficient distance from the cargo conveyance 104 so that the beam R intercepts the entire cargo conveyance 104. The angle θ may range from about 30 degrees to about 90 degrees, for example.

The configuration of the detector 106 may depend on the shape of a collimated radiation beam. For example, if the collimated radiation beam R is a fan beam, a one-dimensional detector array 106 comprising a single row of detector elements may be provided. If the collimated radiation beam R is a cone beam, the detector array may comprise a two dimensional detector array 106 comprising two or more adjacent rows of detector elements. The detector array 106 may comprise a plurality of modules of detectors, each comprising one or more rows of detector elements supported in a housing.

As is known in the art, the interaction of transmitted radiation from the source 102 may be used to determine the contents of the cargo conveyance 104 and identify hazardous objects or potentially hazardous objects or materials, such as weapons, explosives and materials with high atomic numbers that could be special nuclear materials ("SNMs") or shielding for SNMs. For example, the attenuation of a radiation beam transmitted through an object is a function of the densities of materials along the path traversed by the radiation beam. Images may be generated from the detected radiation that may reveal the shape and relative density of the contents of the object. Scattered radiation may also be used to generate images of the contents of an object.

Scanning may be conducted at two or more radiation energies to gain more information about the atomic number and mean density of an object in a cargo conveyance. Detection of delayed neutrons resulting from photofission, and/or delayed gamma rays may also be used to confirm the presence of special nuclear materials ("SNMs"), such as thorium, uranium and plutonium. U.S. Pat. No. 5,524,133, which is incorporated by reference herein, describes an example of a dual energy technique for identifying materials within an object that may be used. Examples of photofission techniques and other examples of dual energy techniques that may be used are described in U.S. patent application Ser. No. 11/070,030 (U.S. Pat. No. 8,263,938), Ser. No. 11/070,143 (U.S. Pat. No. 7,257,188), and Ser. No. 11/070,032 (U.S. Pat. No. 7,423,273), which were filed on Feb. 28, 2005, are assigned to the assignee of the present invention and hereby incorporated by reference in their entirety. Delayed gamma rays emitted by highly excited fission fragments may also be detected by sodium iodide (NaI) or thallium doped sodium iodide crystal detectors, plastic scintillators, high purity germanium (HPGe) detectors, or other gamma ray detection methods known in the art.

Radiation scanning by neutrons may also be used to induce nuclear reactions, such as elastic scattering, inelastic scattering, neutron capture, and fission. For example, pulsed fast neutron analysis and thermal neutron analysis may be used to identify conventional explosives, such as trinitrotoluene (TNT), dynamite, and fertilizer based explosives, for example. Pulsed fast neutron analysis is described in U.S. Pat. No. 5,098,640, for example, where multiple unique signatures of light elements, such as hydrogen, carbon, nitrogen, oxygen and (in some instances) chlorine, are used to identify explosives. U.S. Pat. No. 5,098,640 is incorporated by reference in its entirety. Thermal neutron analysis, which detects the presence of nitrogen, is described in U.S. Pat. No. 3,832,545 and U.S. Pat. No. 5,006,299, for example, which are also incorporated by reference herein in their entireties.

Dual view techniques, wherein a cargo conveyance is scanned at two different angles to identify the potential presence of high atomic number material that could be special nuclear material ("SNM") or shielding for SNM, may also be used, as described in U.S. patent application Ser. No. 11/485,150 (U.S. Pat. No. 8,137,976), which was filed on Jul. 12, 2006, is assigned to the Assignee of the present invention and is incorporated by reference herein. Additionally, the presence of isotopes of SNMs may be confirmed using delayed die away techniques, which are also known in the art.

One or more of these scanning and data processing techniques, and/or other techniques, may be used to identify the presence of hazardous or potentially hazardous materials or objects in a container. The data from the radiation detector 106, may be in the form of an image or data upon which the image is based. The data may be analyzed by the computer 124 by one or more techniques discussed above, for example. If in the form of an image, the data may be visually analyzed, as well.

If a suspect region is identified in the container, further, secondary testing may be conducted, such as computed tomography (CT) scanning, digital tomosynthesis or other types of scanning that may provide further information concerning the shape, internal configuration and material content of the suspect region. For example, the presence and location of trigger wiring, power sources and other critical elements of an electronic controlled nuclear weapon may be determined. The computer 124 may be configured to activate an audible alarm and/or visible alarm (such as a light), to indicate the detection of potentially hazardous materials based on the radiation scanning. If such control and/or triggering electronics are identified, they may be disabled by radiation in accordance with embodiments of the invention, as discussed further, below.

In addition to the radiation source 102 and radiation detector 109, one or more chemical agent detectors 200 and/or one or more biological agent detectors 210 may be included in the scanning system 100 to screen for hazardous chemical and biological agents, respectively. The detectors 200 and 210 may be electrically coupled to the computer 124 to provide a signal indicative of the presence of a chemical or biological agent, respectively. If a plurality of detectors 200, 210 are dedicated to the detection of particular respective chemical or biological agents, the computer 124 can make such a determination based on which detector provides a detection signal. The computer 124 may control operation of the detectors 200, 210, as well. As above, the computer 124 and/or the detectors 200, 210 could be configured to set off an audible and/or visible alarm if a chemical/biological agent is detected, as well.

While typical chemical/biological detectors 200, 210 can only detect the presence and not the location of chemical/biological agent, radiation scanning techniques, such as those discussed above, may also be used to gain further information regarding the location and configuration of any chemical or biological weapon or the components thereof, even though the chemical/biological agent itself may be difficult to detect by radiation scanning. For example, after identifying the presence of a hazardous chemical agent using detector 200, the computer 124 may be configured to analyze the data from the radiation detector 106 to identify a container that may be holding the chemical or biological agent. Additional information, such as a manifest of the cargo conveyance, may assist in such a determination. For example, if a glass test tube is found in an X-ray image of a cargo conveyance which is suspected of containing a chemical agent (based on the chemical detector 200) and, according to the manifest, the conveyance only contains fruit, it may be reasonable to conclude that that test tube contains a chemical agent and should be irradiated. If found, such a container can then be targeted for disabling irradiation in accordance with embodiments of the invention, as discussed further, below. If a location of a chemical or biological agent within the container cannot be determined, the entire container may be irradiated to disable the agent. Further radiation scanning may be conducted after the initial radiation scanning and prior to application of disabling irradiation, to assist in determining a location of the chemical or biological agent.

Since chemical and biological agents in the form of a weapon need to be disbursed, explosives and/or triggering electronics typically need to be provided, as well. Explosives and/or triggering electronics may be identified by radiation scanning while the presence of the chemical and biological agents themselves may be detected by chemical and biological detectors. Control and/or triggering electronics can also be targeted for disabling irradiation, along with a region proximate electronics, which may include the chemical or biological agent.

The one or more chemical detectors 200 may be used to detect: 1) chemical agents such as chlorine gas, phosgene, sarin and other nerve agents, for example; and/or 2) conventional explosives, such as trinitrotoluene (TNT), dynamite, and fertilizer based explosives, for example. The one or more biological detectors 210 maybe used to detect biological agents, such as anthrax, small pox, tularemia, and hemorrhagic fever, for example.

The chemical and/or biological detectors 200, 210 may include sensors employing ion mobility, READ (Reversal Electron Attachment Detection), mass spectrometry, gas chromatography, ion mobility spectrometry or other methods known in the art, for example. Ion mobility spectrometers which are available from Smiths Detector, a part of Smiths Group plc, London, England ("Smiths"), and GE Security, Bradenton, Fla., for example, and READ detection systems, which are available from FemtoTrace Inc., Pomona, Calif., may be used to test for the presence of explosives and other chemicals. Smiths also manufactures chemical weapon detectors for the military and personal use that may be adapted for use in systems in accordance with embodiments of the invention. Samples of air from around or inside the cargo may be taken to test in order to perform certain types of testing, as is also known in the art. Examples of chemical and biological detectors that may be used are also described in U.S. Pat. No. 6,610,977, U.S. Pat. No. 5,585,575, U.S. Pat. No. 6,711,939, and U.S. Pat. No. 6,834,533, which are incorporated by reference herein, in their entireties.

In accordance with embodiments of the invention, the system 100 may be configured to inspect the cargo conveyance 104 using the radiation source 102 and the detector 106 prior to inspecting the cargo conveyance with the detectors 200 and 210. Alternatively, the detector 200 or detector 210 may be used first or even at the same time as the detector 106. Likewise, the location of the detectors may be arranged in various configurations. For example, the detectors 106, 200, and 210 may be located at the same linear position along the conveyor system 108. Alternatively, the detectors 106, 200, and 210 may also be located at different positions along the conveyor system 108 or even separated entirely on different conveyors systems or in separate facilities.

In accordance with embodiments of the invention, once a hazardous object 300 or 310 is identified using, for example, the source 102 and the detector 106 and/or the chemical and biological detectors 200 and 210, the hazardous objects may be targeted with radiation in order to disable the hazardous object 300 or 310.

If one or more hazardous biological agents, such as anthrax, smallpox, tularemia and/or hemorrhagic fever, for example, are discovered in the cargo conveyance 104, the biological agent may be targeted with radiation to disable the agent. Biological agents may be disabled by sterilization, for example. In order to disable the biological agent, radiation may be delivered directly to the biological agent in situ. In one example of an embodiment of the invention, dose rates of at least 25 kGy are applied to disable biological agents. In another example of an embodiment of the invention, dose rates of at least 40 kGy are applied to disable biological agents. If detectors 210 dedicated to particular biological agents are provided, the dose rate applied may depend on the agent identified.

The absorbed dose required to sterilize medical devices is 25 kGy, according to "Sterilization of medical devices, validation and routine control of sterilization by irradiation," European Standard DIN EN 552:1994E, CEN, European Committee for Standardization (1994), which is incorporated by reference herein in its entirety. 25 kGy is also said to be a usual sterilization dose in Scharf, Waldemar H., *Biomedical Particle Accelerators*, AIP Press, Chapter 8, p. 571 (1994). *Biomedical Particle Accelerators* is also incorporated by reference herein in its entirety.

To disable some forms of anthrax, absorbed doses of about 40 kGy or more have been found to be required. For example, the United States Postal Service has reportedly used absorbed doses of 41.5 kGy to kill two different strains of anthrax spores, including the Ames strain which was found in the anthrax-contaminated mail found in October of 2001. (OCA Opinion on Irradiation of the Mails, Nov. 8, 2001, updated Nov. 19, 2001 (www.organicconsumers.org/Irrad/opinion-.cfm.). Doses of 40 kGy and above to destroy strains of anthrax are also discussed in "Destruction of *Bacillus Anthracis* strain Sterne 34F2 spores in postal envelopes by exposure to electron beam irradiation," Niebter, S. E., Dickson, J. S., Letters in Applied Microbiology 2003, 37, 17-20. As is known in the art, absorbed dose of about 25 kiloGrays ("kGy") is typically required for sterilization of medical equipment and materials in the medical industry.

If a hazardous chemical agent is identified, radiation may be delivered to the container to break the chemical bonds in materials, rendering hazardous chemicals or chemical weapons harmless or reducing the toxicity so that the chemicals can be handled more safely. If the location of the chemical agent can be determined from the detected radiation during scanning, the disabling radiation may be directed at that location. If not, the entire container may be irradiated with disabling radiation. Absorbed doses in the range of from about 100 kGy to about 300 kGy may be used to effectively alter the chemical bonds, such as by cross linking polymers.

If a conventional, electronic controlled high explosives bomb, a radiological bomb triggered by conventional explosives or a nuclear device is identified within a container 104, high radiation doses may be delivered from a radiation source 102 to render the control and/or trigger electronics non-functional. Absorbed doses of from about 100 Gy to about 500 Gy have been shown to damage semiconductor devices such as transistors, resulting in single or multiple event upsets. Modern microprocessors and simple integrated circuits, which may be used to control such devices, can be rendered non-functional with a single or multiple event upsets. Non-semiconductor based electronic components, such as capacitors, inductors and resistors may require higher doses to be incapacitated. Control and triggering electronics for chemical and/or biological weapons may also be targeted with radiation to disable the weapons.

As would be understood by one skilled in the art, the time required to deliver the correct absorbed dose may be estimated by known techniques by examining the container using X-rays and determining the mean density of the material to be sterilized, for example, from X-ray images. Additionally, it should be understood that the time required to deliver an absorbed dose may be shortened by increasing the dose rate of the radiation beam, for example by increasing the energy of the source 102.

Upon identification of a hazardous object in the cargo conveyance, the delivery of radiation may be accomplished immediately without moving the cargo conveyance when it is necessary to act quickly or if movement of the cargo conveyance presents additional danger. In other embodiments of the invention, the hazardous object may be removed to an alternative location where the hazardous object may be targeted with radiation.

In accordance with one embodiment of the invention, the radiation source 102, shown in FIG. 1, may be employed as the source for inspecting the cargo conveyance 104 and as the source for delivering the necessary absorbed dose of radiation. Because the radiation source 102 of system 100 is used for scanning, the source 102 may be used to disable a hazardous object immediately after detection without the need to move the cargo conveyance 104. This may be particularly useful when a potential threat poses an immediate danger to the facility and the personnel, such as an explosive device having an electronic timer attached. In one example, radiation is immediately delivered from the source 102 to a potential threat as a precautionary measure until additional resources may be retrieved or until the cargo containing the threat is ready to be moved to another location.

In order to deliver radiation immediately after detection, the radiation source 102 may include a linear accelerator that may be operated at more than one energy regime to produce X-rays at different energy levels. For example, radiation sources may operate in a scanning mode and a high output mode. Linear accelerators that may be used to emit radiation at multiple energy levels are described in U.S. Pat. No. 6,366,021 B1, U.S. Pat. No. 4,400,650 and U.S. Pat. No. 4,382,208, which are assigned to the assignee of the present invention and are incorporated by reference herein. Another linear accelerator that may be used is described in U.S. application Ser. No. 10/745,947 (U.S. Pat. No. 7,339,320) filed on Dec. 24, 2003, which is also assigned to the assignee of the present invention and is incorporated by reference herein. A Linatron M9 linear accelerator, manufactured by Varian Medical Systems, Inc. of Palo Alto, Calif., may also be used at single or multiple energies.

Alternatively, separate X-ray sources (not shown in FIG. 1) may be included in system 100 for use during sterilization and/or disabling. For example, the Dynamitron and the Rhodotron®, produced by IBA, Inc., Louvain-la-Neuve, Belgium may be used for the sterilization and/or disabling and may be configured to deliver X-rays at higher average power levels than a linear accelerator. The second source could be adjacent to the first source, for example. Two sources 615 are shown schematically in FIG. 4.

The radiation source 102 may first operate in a scanning mode for inspection. For example, in the scanning mode the radiation source may produce X-ray photons in the range of about 6 MeV to about 9 MeV, with the radiation source operating in the energy regime of about 6 MeV to about 9 MeV. It should be understood that much higher energy photons may be used for scanning. Additional considerations may be required such as potential activation from $(\gamma,n)$, $(\gamma,p)$, and/or neutron capture reactions, as well as the additional cost of shielding and equipment at a facility operating at higher energy levels.

Once a hazardous object is identified, the radiation source 102 energy may be increased so that it operates in a high output mode for disabling the hazardous object. For example, in the high output mode the radiation source may produce X-ray beams with a dose rate of about 30 to about 150 Gy/min in the energy regime of about 9 to about 16 MeV, for example. Higher energies may be used in a high output mode. Although higher energy photons, for example energies from about 16 MeV to about 25 MeV, are often prohibited from use in scanning systems, it is contemplated that high energy photons may be allowed in the event of a hazardous object needs to be disabled quickly.

A hazardous object may be targeted by the source 102 operating exclusively in a scanning mode to deliver the necessary absorbed dose and disable the hazardous object. However, by employing a dual energy linear accelerator in the source 102, the energy of the source 102 may be turned up such that the hazardous object may be targeted in a high output mode, taking less time to disable the hazardous object.

Multiple radiation sources may also be used in both scanning and high output modes in order to provide radiation for inspection and disabling of hazardous objects. Regardless of the configuration, the system 100 of FIG. 1 may be configured to provide disabling radiation to an identified hazardous object immediately after identification. As would be apparent to one of ordinary skill in the art, the system 100 may require additional shielding in order to handle the radiation source 102 in the high output mode.

In accordance with another embodiment of the invention, the necessary absorbed doses of radiation may be delivered using either electrons or photons. Some linear accelerators, such as a CLINAC® or Linatrons® from Varian Medical Systems Inc. in Palo Alto, Calif., may be configured to produce both an X-ray beam and an electron beam (not shown in the figures). Other examples include radiation sources produced by IBA Inc., Louvain-la-Neuve, Belgium, Vivivirad S. A., Handschuheim, France, American Science and Engineering, Inc., Billerica, Mass. and Linac Technologies, Orsay, France. Additionally, linear accelerators known to those of skill in the art with removable targets or linear accelerators having a "switchyard" may be used to produce either X-ray beams or electron beams. A "switchyard" (not shown), which uses a bending magnet, may be used to bend the electron beam such that electrons may exit the accelerator through a separate beam line and window (not shown) as an electron beam. As discussed above, the electron beam may be used to directly target a hazardous object and deliver a high dose rate of radiation.

As is known in the art, the dose rate delivered via electrons is estimated to be at least about $1.0 \times 10^5$ to about $1.0 \times 10^6$ times higher than that of X-ray photons and results in a much faster accumulation of absorbed radiation. However, electrons do not penetrate very deeply into containers comprising steel or wood walls. Electrons may be advantageously used to deliver an effective dose of radiation to targets within containers with less dense walls, such as cardboard boxes, and through lightly packed materials. For example, radiological, chemical and biological agents or weapons hidden in cardboard boxes having a height, length and width of 1 foot (0.30 meters), for example, packed with medical syringes, for example, could be disabled by electron beams. Electrons having energies of from about 10 MeV to about 15 MeV, may be used, for example.

In larger cardboard containers, a target that is close to a wall of the container 104, such as the target 300 in FIG. 1, may be effectively irradiated and disabled by electron beams. The target 300 could be up to about 0.5 meters to about 1.0 meters from the wall, for example. However, if the hazardous materials are not near the outer surface of the container 104 or if the hazardous object is on the opposite side of the container 104, as is the target 310 in FIG. 1, for example, X-rays may be used to deliver the absorbed dose to the target 310.

As discussed above, the radiation source 102 may include an adjustable collimator that allows the radiation source 102 to adjust the size and position of the radiation beam. For example, the radiation source 102 (shown in position 102') may be adjusted to emit a narrow beam 320 such that the hazardous object 310 and an area around the object is targeted. This allows the hazardous object 310 to be targeted with radiation without directing further radiation at the entire cargo conveyance 104. Alternatively, the collimator may be adjusted to emit a larger beam, such as a cone beam or a fan beam, for example, to irradiate a larger portion of the cargo conveyance or the entire cargo conveyance. The cone beam may be a rectangular pyramidal cone beam, for example.

As is known in the art, an X-ray beam generated from the source 102 would be most intense about the centerline of the radiation source 102. In order to aim the centerline at an intended target, the radiation source 102 may be mounted on, for example, a motion table, robotic arm, gantry, or other actuator. As shown in FIG. 1, a hinge or actuator 101 may be used to aim the radiation source 102. For example, the radiation source 102 may be moved to position 102' (shown in dashed lines) using actuator 101 such that the narrow beam 320 is pointed directly at the object 310.

As discussed above, it should be understood that multiple radiation sources 102 may be employed in the system 100 beyond the single radiation source 102 shown in FIG. 1. Additionally, one or more radiation sources may be dedicated to the production of only electrons and one or more radiation sources may be dedicated to the production of only X-rays without deviating from the scope and spirit of the invention.

Figure 2:
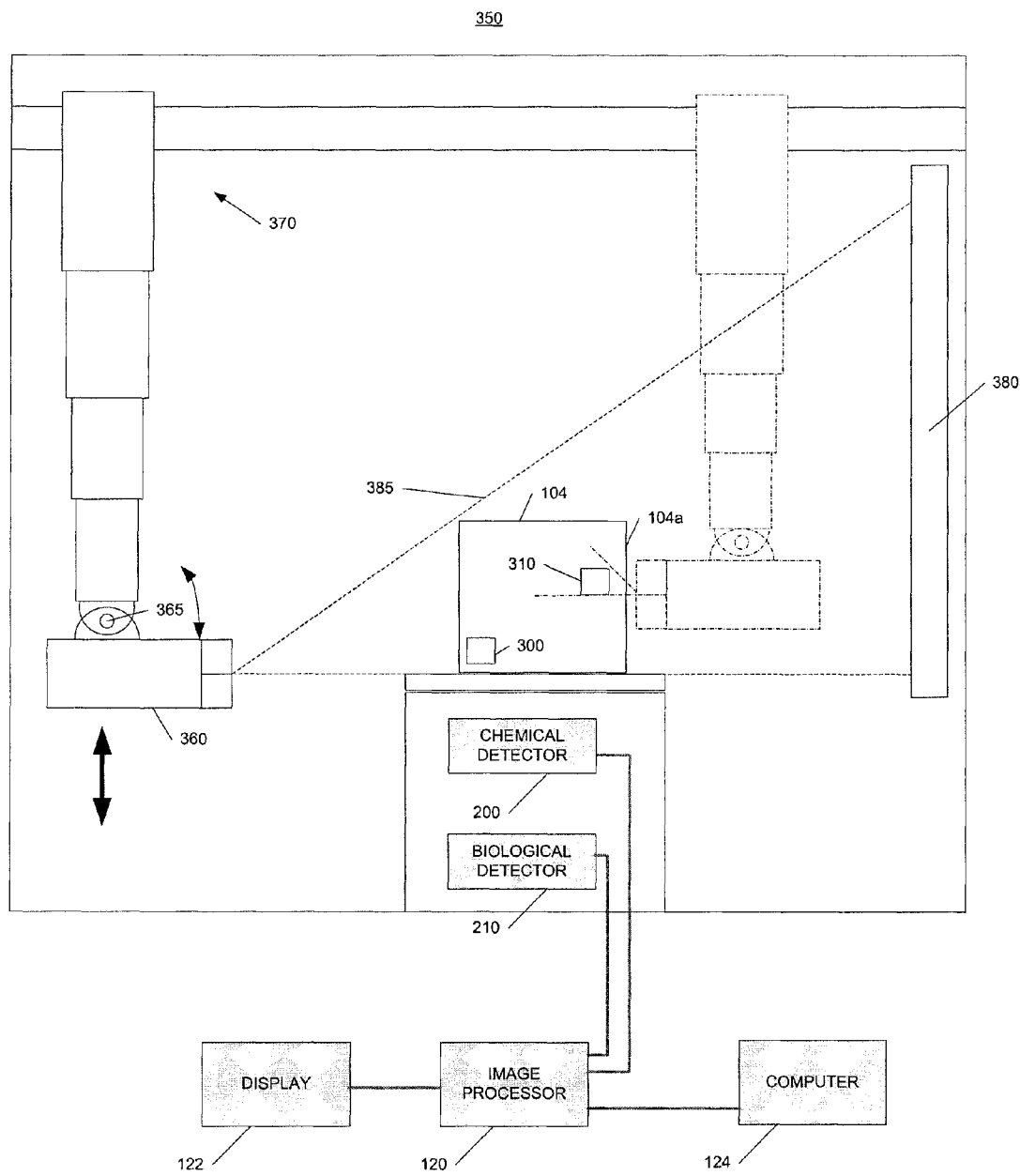
FIG. 2 is a schematic representation of a system in accordance with another embodiment of the invention.

FIG. 2 is a schematic representation of an example of a system 350 in accordance with another embodiment of the invention. In this example, a radiation source 360 is located on a hinged actuator 365 and mounted on a crane system 370 that is configured to telescope the source 360 up and down. The crane system 370 and the hinge actuator 365 allow the radiation source 360 to be moved in order to aim the source 360 at the container or cargo conveyance 104 from many different positions, as shown by the double headed arrows. As shown with beam 385, the radiation source 360 may be used in a scanning mode in connection with a detector 380 in a manner discussed with reference to FIG. 1 for detecting hazardous objects 300 and 310 inside cargo conveyance 104. For purposes of scanning the cargo conveyance, a radiation beam 385 may be used and sized such that the entire cargo conveyance 104 is included in the beam 385. Additionally, the system 350 may include a chemical detector 200 and a biological detector 210. The detectors 200, 210, 380 may be connected to the image processor 120, the computer 124, and the display 122, as discussed above. In the scanning mode, the radiation source 360 may be configured to generate an X-ray beam 385 for inspecting the cargo conveyance 104. It should be understood that the chemical sensors and/or biological sensors may need to sample air from inside the container. This could be accomplished, for example, by direct penetration of the container or by the use of a vacuum pump.

Upon identification of a hazardous object, such as the object 310, the radiation source 360 may be used to immediately target the hazardous object with radiation. The crane system 370 and the actuator 365 may be used to position the radiation source 360 closest to the hazardous object. Movement of the radiation source 360, for example to the opposite side of the cargo conveyance 104 (as shown with the radiation source is in position 360'), may allow the radiation source to more directly target the hazardous object 310 located close to the wall 104a. If the container 104 is a large cardboard container, for example, the crane system 370 may allow the radiation source 360 in the position 360 to target the hazardous object 310 with electrons because the electrons would not have to pass through the entire container to reach the hazardous object 310. Additionally, the use of the crane system 370 may allow the radiation source 360 to be positioned such that the radiation beam may avoid innocuous dense objects within the container 104 that have been identified during scanning, on its way to the hazardous object. In this way, the amount of radiation delivered to the hazardous object 310 may be maximized.

In some cases, a system, such as the systems 100 and 350 shown in FIGS. 1 and 2, may be configured only for scanning, may not be sufficiently equipped to handle a hazardous object, or may be located in a highly populated area. In such cases, the removal of the hazardous object to another facility may be beneficial. As such, upon identification of a hazardous object the cargo conveyance 104 may be removed from the system 100 shown in FIG. 1 or the system 350 shown in FIG. 2 and transported to a secondary or remote location. If the hazardous object does not require immediate removal to a remote, low populated location, the cargo conveyance 104 may be moved to an adjacent facility in order to prevent a backup or delay in processing other cargo conveyances and to limit the exposure of the hazardous object to personnel and facilities. However, if the hazardous object 310 needs to be removed to a remote, low population area, the cargo conveyance 104 may be transported by ship or other transportation to a desert, a mountain, underground, open sea, or to another low population area, for example. Additionally, it is contemplated that the cargo conveyance 104 may be transported to a specialized facility, such as a military base, hazardous material team facility, etc., thereby placing the hazardous object 310 in the hands of those most qualified to handle it.

Optionally, the secondary or remote location may include another system 100 (shown in FIG. 1) or system 350 (shown in FIG. 2) where the cargo conveyance 104 may be scanned and tested a second or third time to confirm the presence of a hazardous object. If secondary testing is not necessary or the presence of a hazardous object 310 is confirmed, the hazardous object may be immediately targeted with one or more radiations sources in order to deliver the necessary absorbed dose of radiation. As discussed above, a radiation source may be configured to operate as a scanning device and as the radiation source for disabling with an absorbed dose of high energy radiation.

Figure 3:
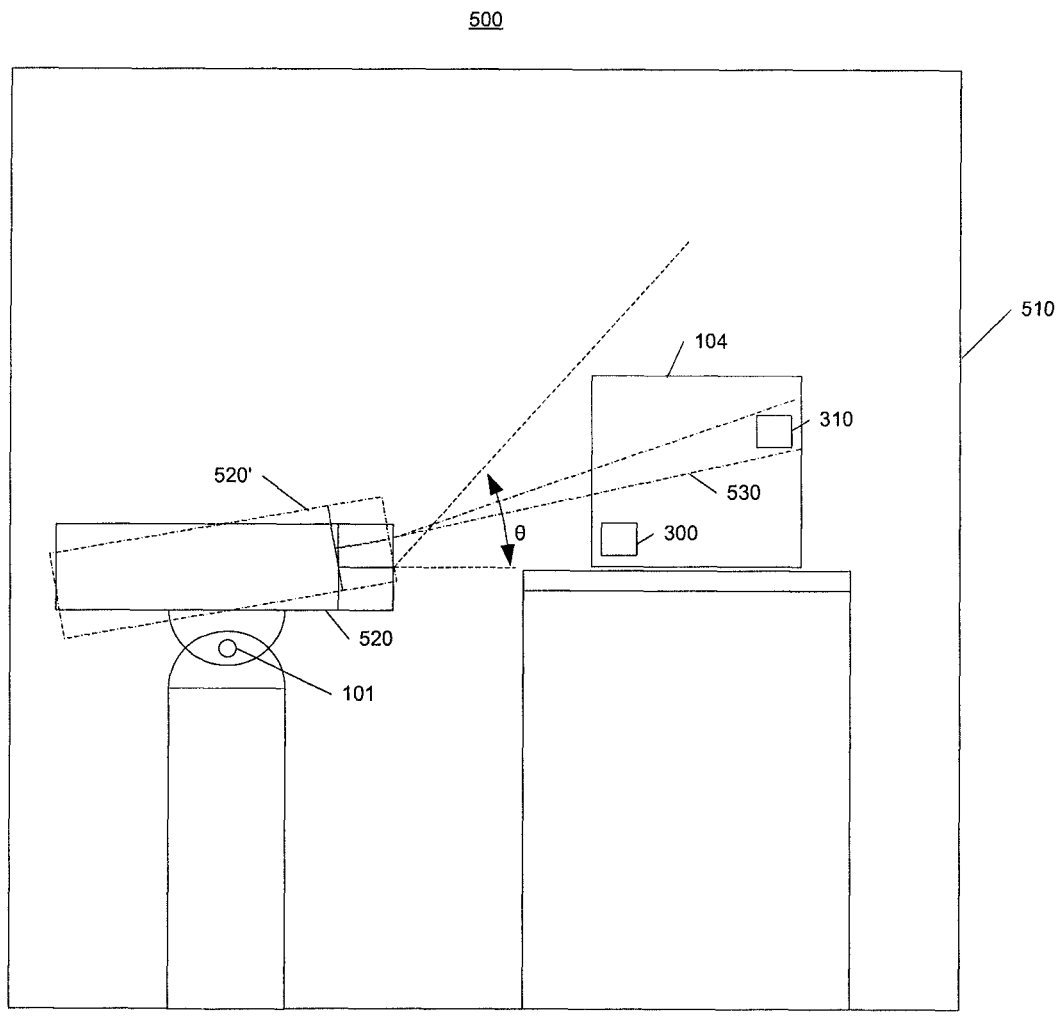
FIG. 3 is a schematic representation of another system in accordance with yet another embodiment of the invention.

As an alternative, another system 500, schematically shown in FIG. 3, may be configured as a dedicated disabling system for delivery of external radiation to an identified hazardous object 300 or 310. It is contemplated that the system 500 may not include a detector and would be used when additional scanning and testing is unnecessary. As shown in FIG. 3, the remote system 500 may include a shielded area 510 and a high output radiation source 520, which, without the need for scanning, may be configured to operate in a high energy regime at all times. Using the system 500, the hazardous objects 300 and 310, for example, may immediately receive the necessary absorbed dose of radiation upon arrival.

As with the system 100 shown in FIG. 1, the radiation beam and the position of the radiation source 520 may be adjusted using a collimator and the actuator 101, as shown in FIG. 3, to direct radiation at either the entire cargo conveyance 104 or to direct radiation at a smaller portion of the cargo conveyance 104. For example, the radiation source 520 may be moved or directed, to a position 520' (shown in phantom), such that a radiation beam 530 is directed at the hazardous object 310. Although the necessary absorbed dose could be delivered to the hazardous object 310 in its initial position with the wide angle beam, by directing the narrow beam 530 from the position 520', as shown in FIG. 3, the hazardous object 310 will accumulate the necessary absorbed dose more quickly because the highest intensity portion of the X-ray beam is inline with the hazardous object 310.

Figure 4:
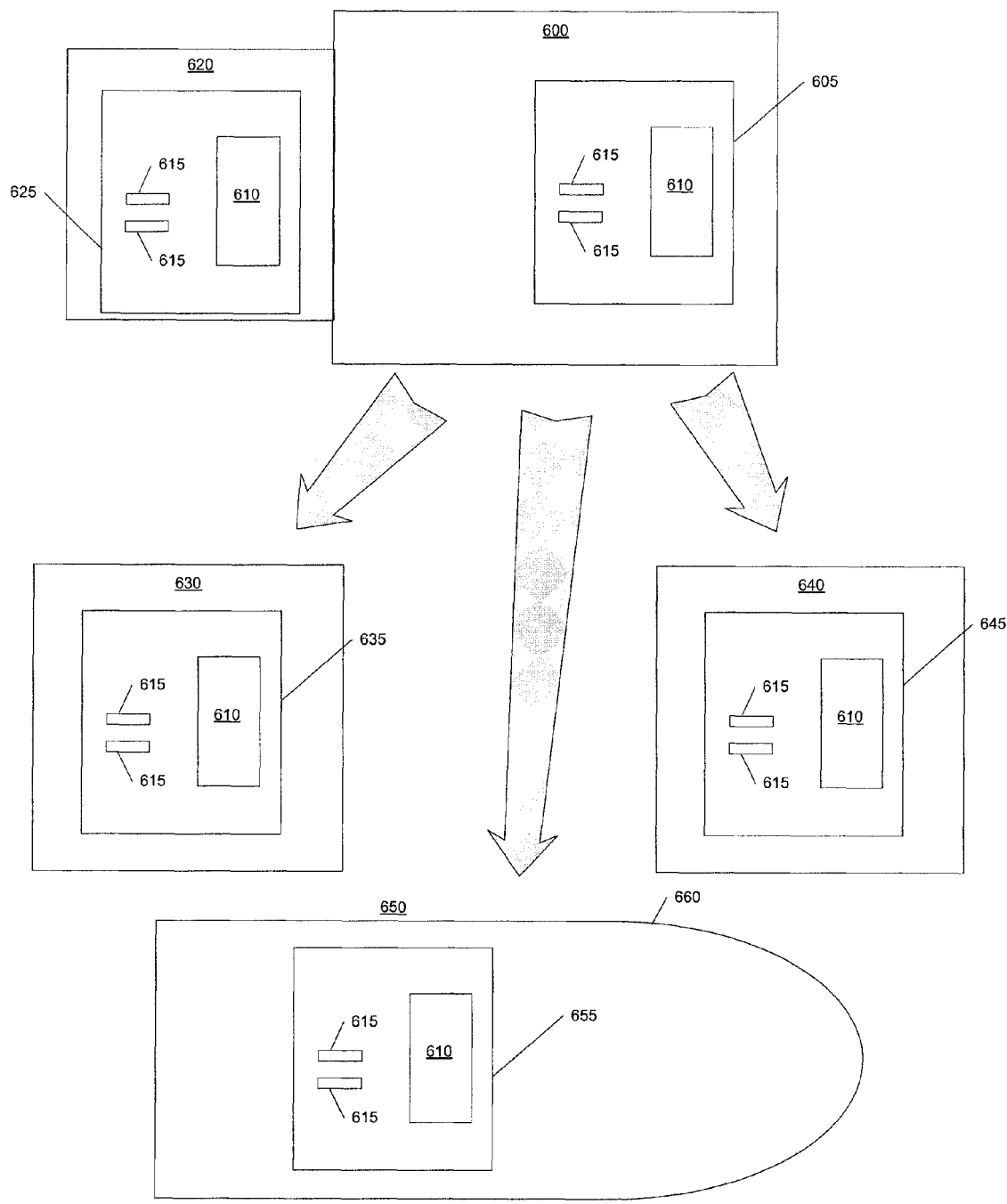
FIG. 4 schematically illustrates various options in accordance with embodiments of the invention.

FIG. 4 schematically illustrates various options in accordance with embodiments of the invention. A main facility or first location 600 may include a port of entry, such as a seaport, where large numbers of cargo conveyances or other containers may pass as they enter the country or pass through a border. The main facility 600 may include an inspection system 605 for scanning cargo conveyances, as discussed above in reference to FIG. 1 and FIG. 2. For example, the system 605 may scan cargo conveyance 610 using radiation sources 615 in order to identify hazardous objects within the cargo conveyance 610. Two radiation sources 615 are schematically shown in system 605, in this example, illustrating that systems such as those shown in FIGS. 1, 2 and 3 may be configured with multiple radiation sources. However, it should be understood that alternative configurations for radiation sources may be used without deviating from the scope and spirit of the invention.

If a hazardous object is identified by system 605, one or both radiation sources 615 may be configured to operate in a high output mode and deliver radiation immediately to cargo conveyance 610 without having to move the cargo conveyance 610, as discussed in detail with reference to FIG. 1 and FIG. 2. It should be understood that even if the cargo conveyance 610 requires transportation to a secondary location for high energy radiation exposure, the radiation sources 615 may be used to begin delivering radiation energy as preparations are made for transportation of the cargo conveyance 610, regardless of whether the radiation is delivered to the hazardous object using the scanning mode or the high output mode. This radiation exposure may also serve to augment any future disabling radiation and possibly make movement or transportation of the cargo conveyance 610 safer for personnel.

The cargo conveyance 610 may be transported to another location or facility 620 adjacent the main facility 600, allowing for quick and efficient exposure to high energy radiation. The facility 620 may include a system 625 that may resemble the system 100 in FIG. 1 or system 350 in FIG. 2 if additional scanning or testing is required. Alternatively, the system 625 may resemble the system 500 shown in FIG. 3. Regardless of the configuration of the system 625, the cargo conveyance 610 may receive the necessary absorbed dose of radiation from the radiation sources 615 in the system 625 without causing any delay or backup in the main system 605.

Alternatively, the cargo conveyance 610 may be transported, for example by land, sea, and/or air, to a specialized facility 630. The specialized facility 630 may include a military base or hazardous materials site where trained personnel may be ready to receive the cargo conveyance 610. The specialized facility 630 may also include a system 635 resembling the system 100 in FIG. 1, the system 350 in FIG. 2, or the system 500 in FIG. 3, for example, where the necessary absorbed dose may be delivered to the hazardous object by the radiation sources 615.

The cargo conveyance 610 may also be transported to a remote facility 640. The facility 640 may be located in a low population area, such as a desert area or secluded mountains, for example. The facility 640 may include a system 645 resembling the system 100 in FIG. 1, the system 350 in FIG. 2, or the system 500 in FIG. 3, where the necessary absorbed dose may be delivered to the hazardous object by the radiation sources 615.

The cargo conveyance 610 may also be transported to a remote facility 650 located out at sea. The location of the facility 650 may be sufficiently removed from the coast such that any exposure of the hazardous object to a coastline may be minimized if the hazardous object is activated or detonated. The facility 650 may include a system 655, which like the others may resemble system 100 in FIG. 1, the system 350 in FIG. 2, or system 500 in FIG. 3. As shown in FIG. 4, the system 655 may be located on a ship 660. However, the system 655 may be located on other floating or fixed platforms, for example.

The radiation sources 615, shown in FIG. 4, may be configured to function in both the scanning mode and/or the high output mode, as discussed above. In addition, the radiation sources in the high output mode may be configured to deliver both electrons and X-ray photons. When one or more radiation sources are employed as shown schematically in FIG. 4, one radiation source 615 may be dedicated to the production of an electron beam only while the other radiation source 615 may be dedicated to the production of X-ray photons only, for example.

Figure 5:
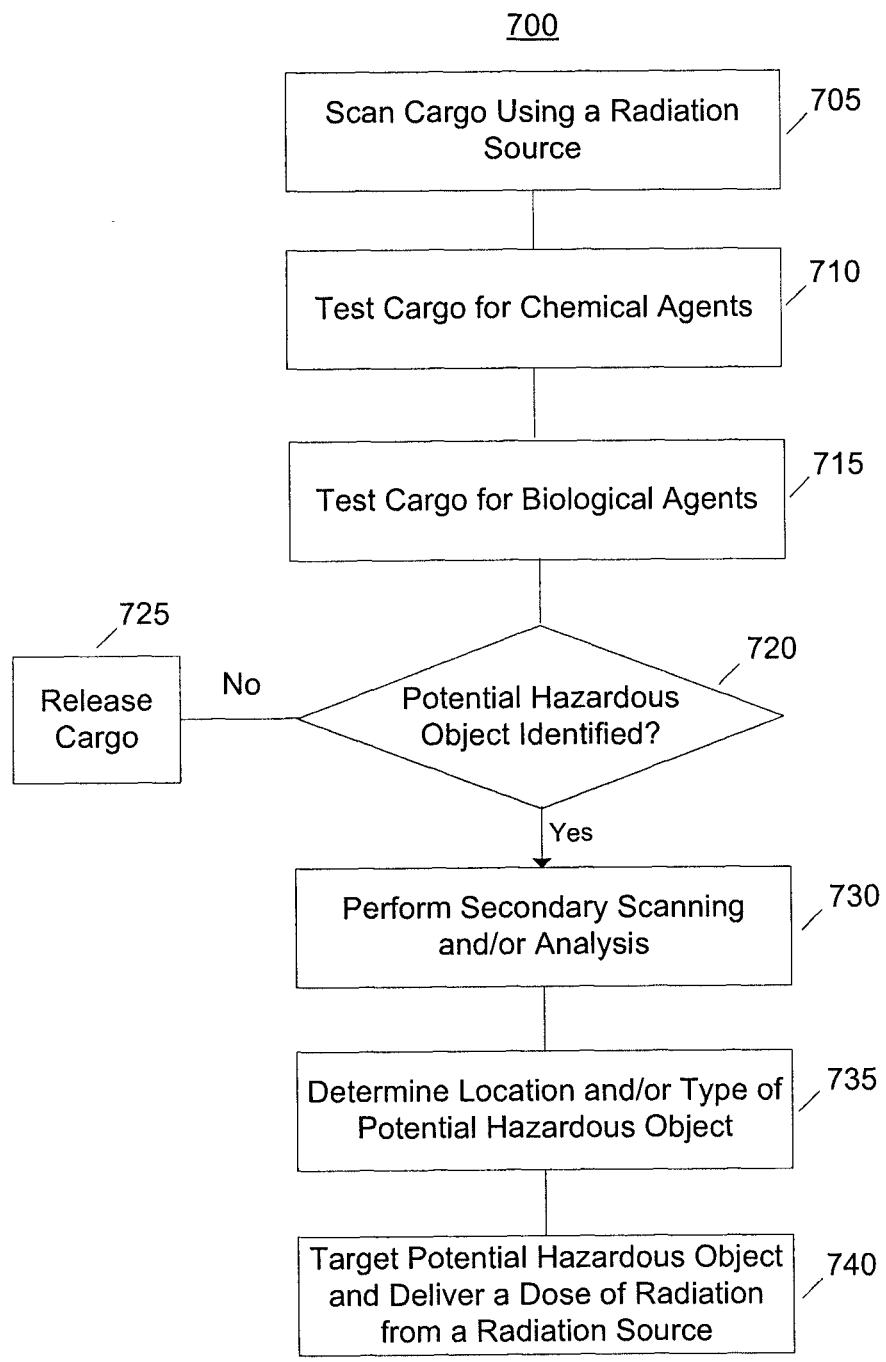
FIG. 5 is an example of a flow diagram of a method of scanning for the hazardous objects and disabling and/or disabling the hazard of any discovered hazardous objects in accordance with embodiments of the invention.

FIG. 5 is a flow diagram of an example of a method 700 of scanning for the hazardous objects and disabling and/or reducing the hazard of any discovered hazardous objects. A cargo conveyance is scanned with radiation to produce an image of the interior of the cargo, in Step 705. As discussed above, various methods of scanning cargo and identifying hazardous objects may be employed to identify potential high atomic number material and/or high density material that could be SNMs or shielding for SNMs, as well as to identify potential conventional explosive materials. For example, Step 705 may include scanning the cargo conveyance with one or more radiation beams generated by one or more linear accelerators, detecting radiation transmitted through the cargo conveyance, and suitably analyzing the detected radiation.

The cargo conveyance is tested for the presence of chemical agents in Step 710 and for the presence of biological agents in Step 715. Suitable chemical and biological detectors may be used. Steps 705, 710 and/or 715 may be performed simultaneously, or in any order.

If a potentially hazardous object is not identified in Step 720, the cargo may be released in Step 725 to other inspection or processing facilities. However, if a hazardous object is identified in Step 720, then secondary testing may optionally be performed to confirm the presence of the hazardous object, in Step 730. If additional testing is not desired or required, Step 730 may be skipped with the cargo progressing directly to Steps 735 and/or 740.

Once a potentially hazardous object is identified, the location and/or the type of hazardous object may be determined in Step 735, based on the prior testing. However, Step 735 may not be necessary if the location and type of hazardous object has already been determined in Steps 705, 710, 715 and/or 720. The hazardous object may then be targeted with an accelerator source and a suitable dose of radiation delivered, based, at least in part, on the type and location of hazardous object identified, in Step 740.

If, for example, further radiation scanning and/or analysis performed in Step 730 indicates to a desired degree of confidence that a high atomic number material is present, then the data may also be analyzed for the presence of electronics, such as control and/or triggering electronics, associated with the high atomic number material. If such electronics is present, the electronics may be located in Step 735 and irradiated by a suitable dose of radiation. If no such electronics is found, then the cargo conveyance may be removed from the facility and processed in other ways.

Similarly, if chemical or biological agents are found, the results of the radiation scanning in Step 705 may be used or further scanning and/or analysis in Step 730 may be performed to determine whether electronics, such as control and/or triggering electronics, are present, as well as to determine a location of the agent, if possible. If the agent cannot be located, the entire cargo container may be irradiated with a suitable dose of radiation.

Steps 730, 735, and/or 740 may either be performed with the same equipment and at the same location as in Steps 705, 710 and 715 without having to relocate the cargo prior to targeting the hazardous object with an accelerator source in the high output mode or in a separate facility. The separate facility may be a remote facility, for example. The use of a separate facility for secondary testing and disabling, if necessary, may improve the throughput of an inspection facility.

While the embodiments of the invention have been described as including scanning using X-rays, testing for chemical agents, and testing for biological agents, it should be understood that it is not necessary to perform all three, or even two, in order to practice embodiments of the invention. If a hazardous object is identified by scanning a cargo conveyance with X-rays only, then the system may be configured to directly target the cargo conveyance and the hazardous object within with high energy radiation. Further, a hazardous object may be identified using only a chemical detector and/or a biological detector prior to targeting the hazardous object with radiation, as well.

While the inspection of cargo conveyances is described above, embodiments of the invention may be used to examine other containers, such as luggage, bags, boxes, etc.

While the charged particles in the radiation sources discussed above are electrons and the generated radiation is X-ray radiation, other charged particles, such as protons and deuterons, may be used to generate other types of radiation. For example, gamma ray radiation may be generated by the impact of protons on materials such as lithium, carbon or sulfur. Additionally, as mentioned above, the radiation source may be a source of neutrons, which may be used for scanning and/or disabling. Semiconductor based devices and other electronic devices are known to be sensitive to low energy neutrons, on the order of a few keV, for example.

While the source described above is a linear accelerator, other types of sources may also be used, such as a betatron, cyclotron, or radio frequency quadropole, for example. Additionally, an X-ray tube may be used for scanning and disabling a hazardous object where the container is less than five feet (about 1.5 meters) wide or between about 2 to 3 feet (about 0.6 meters to about 0.9 meters) wide.

Examples of implementations of embodiments of the invention are described above. Modifications may be made to these examples without departing from the scope of the invention, which is defined by the claims, below.

What is claimed is:

1. A method of examining an object, the method comprising:
   determining whether a potential threat is present within the object; and
   if so, disabling the potential threat with at least one of a X-ray beam or an electron beam.

2. The method of claim 1, comprising determining whether a potential threat is present by:
   generating a radiation beam;
   scanning at least a portion of the object with the generated radiation beam; and
   detecting the radiation beam after interaction with the contents of the object.

3. The method of claim 2, comprising:
   generating a first radiation beam to scan for the potential threat, by a first accelerator source; and
   generating the at least one of the X-ray beam or the electron beam to disable the potential threat, by a second accelerator source.

4. The method of claim 2, further comprising, after detecting the potential threat and prior to disabling the potential threat:
   transporting the container from a first location to a second location.

5. The method of claim 2, further comprising determining a position of the potential threat within the object.

6. The method of claim 3, wherein the first accelerator source and the second accelerator source comprise the same accelerator, the method further comprising:
   moving the accelerator from a first position to a second position after scanning for the potential threat; and
   disabling the potential threat from the second position.

7. The method of claim 6, comprising moving the accelerator from the first position to the second position to decrease a distance between the accelerator and the potential threat.

8. The method of claim 6, wherein disabling the potential threat comprises:
   directing the electron beam at the potential threat if the potential threat is within a predetermined distance of an exterior surface of the object; and
   directing the X-ray beam at the potential threat if the potential threat is greater than the predetermined distance from the exterior surface of the object.

9. The method of claim 1, comprising:
   determining whether a potential threat is present by sensing for a biological agent by a biological detector; and
   if a potential biological agent is sensed, disabling the biological agent with a dose of radiation from the at least one of the X-ray beam or the electron beam.

10. The method of claim 9, comprising disabling the biological agent by:
    detecting a presence of electronics associated with the biological agent; and
    disabling the biological agent by disabling the associated electronics with the dose of radiation.

11. The method of claim 1, further comprising:
    determining whether a potential threat is present by sensing for a chemical agent by a chemical detector, and
    if a chemical agent is found, disabling the chemical agent with a dose of radiation from the at least one of the X-ray beam or the electron beam.

12. The method of claim 11, comprising disabling the chemical agent by:
    detecting a presence of electronics associated with the potential threat; and
    disabling the chemical agent by disabling the associated electronics with the dose of radiation.

13. The method of claim 11, wherein the potential threat is an explosive threat.

14. A system for examining and disabling a potential threat, the system comprising:
    a chemical detector to detect chemical agents in the object;
    a processor coupled to the chemical detector, the processor being configured to determine whether a chemical agent is present based, at least in part, on data from the chemical detector; and
    a radiation source configured to deliver radiation to at least a portion of the object, to disable a detected chemical agent.

15. The system of claim 14, wherein:
    the radiation source is further configured to scan the object;
    the system further comprising:
    a second detector to detect radiation interacting with the object; and a second processor configured to determine a location of the chemical agent based, at least in part, on data from the second detector.

16. The system of claim 15, wherein:
the second processor is configured to determine a location of the chemical agent by identifying electronics associated with the chemical agent; and
the radiation source is configured to disable the chemical agent by disabling the associated electronics.

17. The system of claim 15, wherein the first processor and the second processor are the same.

18. A system for examining and disabling a potential threat, the system comprising:
a biological detector to detect chemical agents in the object;
a processor coupled to the biological detector, the processor being configured to determine whether a biological agent is present based, at least in part, on data from the biological detector; and
a radiation source configured to deliver radiation to at least a portion of the object, to disable a detected biological agent.

19. The system of claim 18, wherein:
the radiation source is configured to scan the object;
the system further comprising:
a second detector to detect radiation interacting with the object; and
a second processor configured to determine a location of the biological based, at least in part, on data from the second detector.

20. The system of claim 19, wherein:
the second processor is configured to determine a location of the biological agent by identifying electronics associated with the biological agent; and
the radiation source is configured to disable the biological agent by disabling electronics associated with the biological agent.

21. The system of claim 19, wherein the first processor and the second processor are the same.

22. A method of examining an object, the method comprising:
determining whether a potential threat is present within the object by generating a first radiation beam to scan for a potential threat, by a first accelerator source; and
generating a second radiation beam to disable the potential threat, by a second accelerator source.

23. The method of claim 22, further comprising determining a position of the potential threat within the object.

24. The method of claim 22, wherein the first accelerator source and the second accelerator source comprise the same accelerator, the method further comprising:
moving the accelerator from a first position to a second position after scanning for the potential threat; and
disabling the potential threat from the second position.

25. The method of claim 24, comprising moving the accelerator from the first position to the second position to decrease a distance between the accelerator and the potential threat.

26. The method of claim 24, wherein disabling the potential threat comprises:
directing an electron beam at the potential threat if the potential threat is within a predetermined distance of an exterior surface of the object; and
directing an X-ray beam at the potential threat if the potential threat is greater than the predetermined distance from the exterior surface of the object.

* * * * *